United States Patent
Que et al.

(10) Patent No.: US 8,817,218 B2
(45) Date of Patent: Aug. 26, 2014

(54) FAN-OUT WIRING ARRANGEMENT OF TFT-LCD SLIM BEZEL ARRANGEMENT

(75) Inventors: Xiangdeng Que, Guandong (CN); Tsunglung Chang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 179 days.

(21) Appl. No.: 13/699,220

(22) PCT Filed: Sep. 14, 2012

(86) PCT No.: PCT/CN2012/081371
§ 371 (c)(1),
(2), (4) Date: Nov. 20, 2012

(87) PCT Pub. No.: WO2014/036754
PCT Pub. Date: Mar. 13, 2014

(65) Prior Publication Data
US 2014/0071363 A1    Mar. 13, 2014

(30) Foreign Application Priority Data
Sep. 7, 2012 (CN) .......................... 2012 1 0330301

(51) Int. Cl.
*G02F 1/1345* (2006.01)
*G02F 1/1362* (2006.01)

(52) U.S. Cl.
CPC .............................. *G02F 1/136286* (2013.01)
USPC .......................................... 349/149; 349/139

(58) Field of Classification Search
CPC .......... G02F 1/136286; G02F 1/13452; G02F 1/13454; G02F 1/1345
USPC ................................................... 349/139, 149
See application file for complete search history.

(56) References Cited

U.S. PATENT DOCUMENTS

2012/0281369 A1* 11/2012 Chen et al. .................... 361/748

FOREIGN PATENT DOCUMENTS

| CN | 101487962 A | 7/2009 |
|---|---|---|
| CN | 101639594 A | 2/2012 |
| CN | 102543009 A | 7/2012 |
| TW | 201038996 A1 | 11/2010 |

* cited by examiner

*Primary Examiner* — Nathanael R Briggs
(74) *Attorney, Agent, or Firm* — Andrew C. Cheng

(57) ABSTRACT

The present invention relates to a fan-out wiring arrangement of TFT-LCD slim bezel arrangement. The fan-out wiring arrangement includes a first metal layer that is subjected to etching to form parallel first fan-out wires and a second metal layer that is subjected to etching to form parallel second fan-out wires. The first and second metal layers are respectively arranged at upper and lower sides to be parallel to and substantially correspond to each other. The first fan-out wires have line width and fan-out pitch that are identical to those of the second fan-out wires. The first fan-out wires have projections on the second metal layer that are parallel to the second fan-out wires and alternate with the second fan-out wires in an equally spaced manner. The fan-out wiring arrangement realizes wire pitch ≤8 μm, reduces fan-out height, while increasing metal CD, reducing resistance loading, and achieving slim bezel arrangement.

11 Claims, 2 Drawing Sheets

FAN-OUT WIRING ARRANGEMENT OF TFT-LCD SLIM BEZEL ARRANGEMENT

BACKGROUND OF THE INVENTION

1. Field of the Invention

The present invention relates to a TFT-LCD (Thin-Film Transistor Liquid Crystal Display) slim bezel arrangement, and in particular to a fan-out wiring arrangement of TFT-LCD slim bezel arrangement.

2. The Related Arts

TFT-LCD stands for abbreviation of thin-film transistor LCD, which is one of active matrix liquid crystal displays (AM LCDs). Liquid crystal flat panel displays, especially TFT-LCD, is the only display device that is currently known display device that totally matches or is even superior to CRT (Cathode Ray Tube) display devices in general performances in respect of brightness, contrast, power consumption, lifespan, volume, and weight. The TFT-LCD has excellent performance, is extremely good for mass production, can be highly automatized, has a low cost for material, and shows potential prosperous future development and thus can quickly take the position of main stream product in the coming ear and will be the highlight of global economic growth of the 21st century.

A liquid crystal display panel is composed of an active area and a peripheral circuit area. The active area comprises a plurality of pixels arranged therein to form a pixel array. The peripheral circuit area comprises peripheral circuits arranged therein. Each pixel comprises a thin-film transistor (TFT) and a pixel electrode connected to the TFT and each pixel is surrounded by two adjacent scan lines and two adjacent data lines. It is often that the scan lines and the data lines extend from the active area to the peripheral circuit area and are electrically connected through the peripheral circuits to a driver IC (Integrated Circuit). Generally, the driver IC is of a specific size and the peripheral circuits are arranged to converge from the ends connected to the scan lines and the data lines to the site where the driver IC is located to form fan-out wirings.

In an upgraded development and for the market demand of TFT-LCD, a slim bezel arrangement is adopted to achieve aesthetics of visual perception. The arrangement of slim bezel requires a narrowed effective AA (Active Area)-TFT distance. However, the conventional fan-out wiring arrangement adopted in a single metal layer introduces a number of difficult in the design thereof:

(1) First of all, the slim bezel arrangement requires a severer fan-out height and the sum of lead-in fan-out line width and space must be equal to or less than 9 μm.

(2) The resolution of photolithography machine has a limit. That of Nikon photolithography machine is 2.5 μm and that of Cannon photolithography machine is 3.0 μm. Thus, for Nikon photolithography machine, the smallest lead-in space must be 2.5 μm.

(3) A large-sized TFT-LCD requires a thicker metal film. The critical dimension loss of wet etching is controlled at 2.5±1.0 μm. Consequently, the minimum AEI (After Etching Inspection) of product may achieve width/space (L/S) of the fan-out wiring that are 6.0 μpm/2.0 μm (for assessment made on Nikon machine, mask L/S=5.5 μm/2.5 μm).

(4) Referring to FIG. 1, a schematic view is given to illustrate the critical dimension of metal wire of prior art in wet etching. The first metal layer 11 is aluminum, which has a thickness of 3300 Å. The second metal layer is molybdenum, which has a thickness of 600 Å. The conventional arrangement of metal wiring is a two layer overlapping wiring arrangement. Since the metal wiring is formed through wet etching, it also needs to control tape angle in order to the lower corner angle to range from 20° to 60°. Under the assumption that metal sheet resistance (RS)=0.085, thickness=(Al) 3000 Å+(Mo) 600 Å=0.39 μm, calculation results show that to ensure Mo on the upper side will not get lost, the critical dimension (CD)>2×0.39 μm×ctg20° >2.2 μm.

Referring to FIG. 2, a schematic view is given to illustrate a conventional design of mask for single layer metal fan-out wiring. A mask 20 that has been subjected to photo-etching is placed on the metal layer so that a wet etching operation may be performed with the mask 20. To achieve the 7 μm design that is equal to fan-out wiring width plus spacing distance, the mask 20 must be arranged in such a way that the line width (L) is 4.5 μm and the spacing distance (S) is 2.5 μm, namely US=4.5 μm/2.5 μm. The known process and photolithography machine are not capable of achieving such as mask 20.

(5) Thus, the known manufacturing conditions cannot realize line width+spacing equal to or less than 8 μm. A trial test can only be carried out with Line/Space=6.5 μm/2.5 μm, the minimum line CD may be 3.0 μm and it is of extremely high risk to be broken by air knife (AK). Further, if the array side fan-out wire is broken, due to the metal wires are arranged extremely densely, it is not possible to repair, making the product yield rate low.

SUMMARY OF THE INVENTION

Thus, an object of the present invention is to provide a fan-out wiring arrangement of TFT-LCD slim bezel arrangement, which overcomes the issue that the conventional process conditions cannot be realize the sum of line width of fan-out-wiring and spacing distance equal to or less than 8 μm.

To achieve the objective, the present invention provides a fan-out wiring arrangement of TFT-LCD slim bezel arrangement, which comprises a first metal layer that is subjected to etching to form parallel first fan-out wires and a second metal layer that is subjected to etching to form parallel second fan-out wires. The first metal layer and the second metal layer are respectively arranged at upper and lower sides to be parallel to and substantially alternately correspond to each other. The first fan-out wires have line width and fan-out pitch that are identical to line width and fan-out pitch of the second fan-out wires. The first fan-out wires have projections on the second metal layer that are parallel to the second fan-out wires and alternate with the second fan-out wires in an equally spaced manner.

Wherein, the first fan-out wires function as data lines or gate line.

Wherein, the second fan-out wires function as data lines or gate line.

Wherein, the first fan-out wires are odd number sequenced data lines and gate lines and the second fan-out wires are even number sequenced data lines and gate lines.

Wherein, the first fan-out wires are even number sequenced data lines and gate lines and the second fan-out wires are odd number sequenced data lines and gate lines.

Wherein, the fan-out pitches are equal to or less than 8 μm.

Wherein, the fan-out pitches are 7 μm.

Wherein, the line widths are 4.5 μm.

Wherein, the first and second metal layers have identical sheet resistance.

Wherein, the sheet resistance of the first and second metal layers is 0.085.

The present invention also provides a fan-out wiring arrangement of TFT-LCD slim bezel arrangement, which comprises a first metal layer that is subjected to etching to form parallel first fan-out wires and a second metal layer that is subjected to etching to form parallel second fan-out wires, the first metal layer and the second metal layer being respectively arranged at upper and lower sides to be parallel to and substantially alternately correspond to each other, the first fan-out wires having line width and fan-out pitch that are identical to line width and fan-out pitch of the second fan-out wires, the first fan-out wires having projections on the second metal layer that are parallel to the second fan-out wires and alternate with the second fan-out wires in an equally spaced manner;

wherein the first fan-out wires function as data lines or gate line;

wherein the second fan-out wires function as data lines or gate line;

wherein the first fan-out wires are odd number sequenced data lines and gate lines and the second fan-out wires are even number sequenced data lines and gate lines;

wherein the fan-out pitches are equal to or less than 8 µm;

wherein the fan-out pitches are 7 µm;

wherein the line widths are 4.5 µm;

wherein the first and second metal layers have identical sheet resistance; and wherein the sheet resistance of the first and second metal layers is 0.085.

In summary, the fan-out wiring arrangement of TFT-LCD slim bezel arrangement according to the present invention realizes wire pitch being equal to or less than 8 µm, reduces fan-out height, while increasing metal CD, reducing resistance loading, and achieving slim bezel arrangement.

BRIEF DESCRIPTION OF THE DRAWINGS

The technical solution, as well as beneficial advantages, of the present invention will be apparent from the following detailed description of an embodiment of the present invention, with reference to the attached drawings.

In the drawings.

DETAILED DESCRIPTION OF THE PREFERRED EMBODIMENTS

Figure 1:
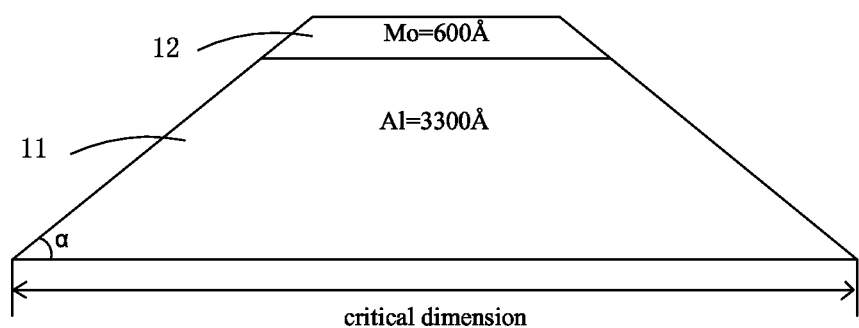
FIG. 1 is a schematic view illustrating critical dimension of prior art metal wire in wet etching.
Figure 2:
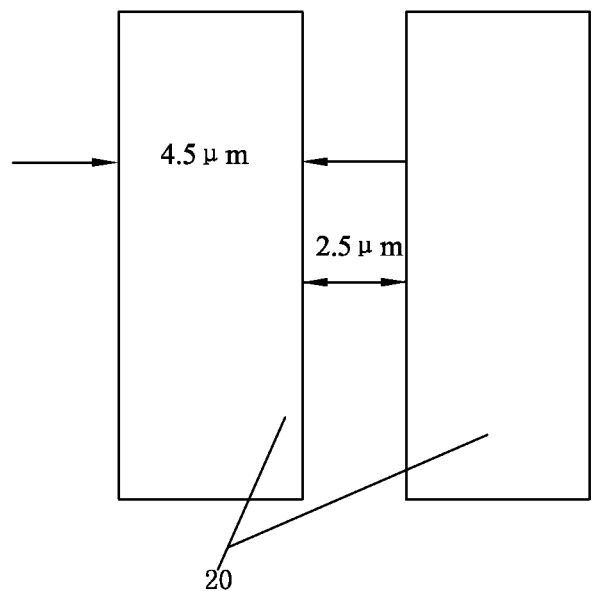
FIG. 2 is a schematic view illustrating a conventional design of mask for single layer metal fan-out wiring.
Figure 3:
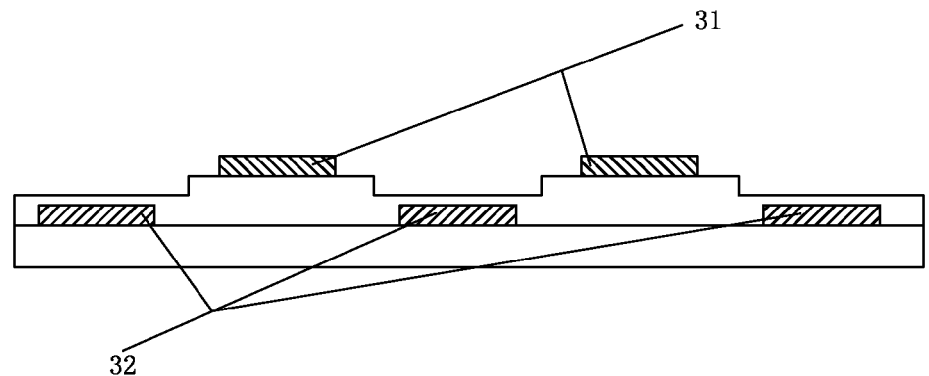
FIG. 3 is a schematic view showing fan-out wiring arrangement of TFT-LCD slim bezel arrangement according to a preferred embodiment of the present invention.

Referring to FIG. 3, a schematic view is given to illustrate a fan-out wiring arrangement of TFT-LCD slim bezel arrangement according a preferred embodiment of the present invention. The fan-out wiring arrangement generally comprises a first metal layer that is subjected to etching to form first fan-out wires 31 that are parallel and a second metal layer that is subjected to etching to form second fan-out wires 32 that are parallel. The first metal layer and the second metal layer are respectively arranged at upper and lower sides to be parallel to and substantially correspond to each other. The first fan-out wires 31 have line width and fan-out pitch that are identical to those of the second fan-out wires 32. The first fan-out wires 31 have projections on the second metal layer that are parallel to the second fan-out wires 32 and alternate with the second fan-out wires 32 in an equally spaced manner. Since the novel feature of the present invention resides on the arrangement of fan-out wiring, other structures that might get related to the metal layers or the fan-out wires, such as the structures of substrate, insulation layer, passivation layer, will not be described herein.

The fan-out wiring arrangement of TFT-LCD slim bezel arrangement according to the present invention adopts a solution of two metal layers alternating each other to realize fan-out wiring that is used to replace the conventional wiring arrangement of two overlapping metal layers or single metal layer. The two alternating metal layer arrangement allows of relatively large critical dimension of line width and reducing resistivity loading.

In the TFT-LCD slim bezel arrangement, a feasible arrangement is that wires of odd numbers are set in the same metal layer while wires of even numbers are set in the other metal layer. For example, the first fan-out wires 31 may be used as data lines or gate lines, and the second fan-out wires 32 are used as data lines or gate lines. The first fan-out wires 31 are sequenced as odd-numbered data lines and gate lines, while the second fan-out wires 32 are sequenced as even-numbered data lines and gate lines; or alternatively, the first fan-out wires 31 are sequenced as even-numbered data lines and gate lines and he second fan-out wires 32 are sequenced as odd-numbered data lines and gate lines. The sheet resistances of the first metal layer and the second metal layers can be the same as each other, corresponding to 0.085.

Figure 4:
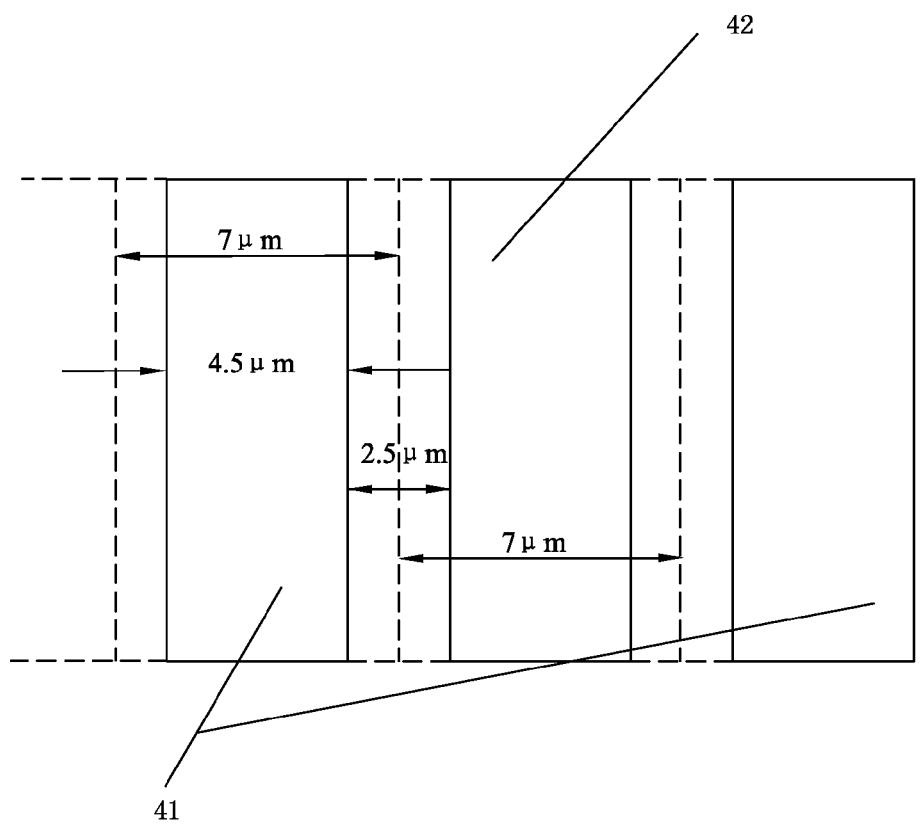
FIG. 4 is a schematic view illustrating a design of mask for fan-out wiring arrangement according to the present invention.

Referring to FIG. 4, a schematic view is given to illustrate a design of mask for fan-out wiring arrangement according to the present invention. Since the fan-out wiring arrangement of TFT-LCD slim bezel arrangement according to the present invention adopts the solution of two alternating metal layers to realize fan-out wiring, two masks, mask 41 and mask 42, may be used in the process of forming the wires with etching. The mask 41 and the mask 42 respectively correspond to different metal layers and thus can be formed respectively. Specifically, referring to the dimensions illustrated in FIG. 4, for each metal layer, the line width/spacing distance (L/S) of the corresponding mask 41 or 42 is 7 µm /7 µm, namely, the line width of the mask is 7 µm and the spacing distance is 7 µm. For the entire two layers of metal, the fan-out wires that can be formed have line width/spacing distance (L/S) equal to 4.5 µm/2.5 µm. The overall fan-out pitch is 7 µm that is equal to or less than 8 µm, thereby realizing the AEI CD of the fan-out wiring being equal to 4.5 µm, reducing the fan-out height, while increasing the critical dimension of metal, reducing resistivity loading, and thus achieving slim bezel arrangement. The dimensions shown in FIG. 4 are only illustrative and selectable dimensions and they can be adjustable according to practical process condition. Further repeated description will not be given herein.

In summary, the fan-out wiring arrangement of TFT-LCD slim bezel arrangement according to the present invention realizes wire pitch being equal to or less than 8 µm, reduces fan-out height, while increasing metal CD, reducing resistance loading, and achieving slim bezel arrangement.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A fan-out wiring arrangement of TFT-LCD slim bezel arrangement, comprising a first metal layer that is subjected to etching to form parallel first fan-out wires and a second metal layer that is subjected to etching to form parallel second fan-out wires, the first metal layer and the second metal layer being respectively arranged at upper and lower sides to be parallel to and substantially alternately correspond to each other, the first fan-out wires having line width and fan-out pitch that are identical to line width and fan-out pitch of the second fan-out wires, the first fan-out wires having projections on the second metal layer that are parallel to the second fan-out wires and alternate with the second fan-out wires in an equally spaced manner.

2. The fan-out wiring arrangement of TFT-LCD slim bezel arrangement as claimed in claim 1, wherein the first fan-out wires function as data lines or gate line.

3. The fan-out wiring arrangement of TFT-LCD slim bezel arrangement as claimed in claim 1, wherein the second fan-out wires function as data lines or gate line.

4. The fan-out wiring arrangement of TFT-LCD slim bezel arrangement as claimed in claim 1, wherein the first fan-out wires are odd number sequenced data lines and gate lines and the second fan-out wires are even number sequenced data lines and gate lines.

5. The fan-out wiring arrangement of TFT-LCD slim bezel arrangement as claimed in claim 1, wherein the first fan-out wires are even number sequenced data lines and gate lines and the second fan-out wires are odd number sequenced data lines and gate lines.

6. The fan-out wiring arrangement of TFT-LCD slim bezel arrangement as claimed in claim 1, wherein the fan-out pitches are equal to or less than 8 μm.

7. The fan-out wiring arrangement of TFT-LCD slim bezel arrangement as claimed in claim 1, wherein the fan-out pitches are 7 μm.

8. The fan-out wiring arrangement of TFT-LCD slim bezel arrangement as claimed in claim 1, wherein the line widths are 4.5 μm.

9. The fan-out wiring arrangement of TFT-LCD slim bezel arrangement as claimed in claim 1, wherein the first and second metal layers have identical sheet resistance.

10. The fan-out wiring arrangement of TFT-LCD slim bezel arrangement as claimed in claim 9, wherein the sheet resistance of the first and second metal layers is 0.085.

11. A fan-out wiring arrangement of TFT-LCD slim bezel arrangement, comprising a first metal layer that is subjected to etching to form parallel first fan-out wires and a second metal layer that is subjected to etching to form parallel second fan-out wires, the first metal layer and the second metal layer being respectively arranged at upper and lower sides to be parallel to and substantially alternately correspond to each other, the first fan-out wires having line width and fan-out pitch that are identical to line width and fan-out pitch of the second fan-out wires, the first fan-out wires having projections on the second metal layer that are parallel to the second fan-out wires and alternate with the second fan-out wires in an equally spaced manner;

wherein the first fan-out wires function as data lines or gate line;

wherein the second fan-out wires function as data lines or gate line;

wherein the first fan-out wires are odd number sequenced data lines and gate lines and the second fan-out wires are even number sequenced data lines and gate lines;

wherein the fan-out pitches are equal to or less than 8 μm;

wherein the fan-out pitches are 7 μm;

wherein the line widths are 4.5 μm;

wherein the first and second metal layers have identical sheet resistance; and wherein the sheet resistance of the first and second metal layers is 0.085.

\* \* \* \* \*